(12) United States Patent
Kim et al.

(10) Patent No.: US 8,441,996 B2
(45) Date of Patent: May 14, 2013

(54) METHOD AND APPARATUS FOR MONITORING CONTROL CHANNEL IN MULTIPLE CARRIER SYSTEM

(75) Inventors: So Yeon Kim, Anyang-si (KR); Jae Hoon Chung, Anyang-si (KR); Yeong Hyeon Kwon, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 461 days.

(21) Appl. No.: 12/752,643

(22) Filed: Apr. 1, 2010

(65) Prior Publication Data

US 2010/0254268 A1    Oct. 7, 2010

Related U.S. Application Data

(60) Provisional application No. 61/165,913, filed on Apr. 2, 2009, provisional application No. 61/167,855, filed on Apr. 8, 2009.

(30) Foreign Application Priority Data

Mar. 31, 2010    (KR) .................. 10-2010-0029425

(51) Int. Cl.
*H04W 72/04* (2009.01)
*H04J 1/00* (2006.01)

(52) U.S. Cl.
USPC ........... 370/329; 370/344; 370/336; 370/280; 370/252; 455/450; 455/452.1

(58) Field of Classification Search ............... 370/241, 370/328, 329–330, 338, 312, 432, 335, 336, 370/342–345, 252, 280, 294–295; 455/450, 455/451, 452.1

See application file for complete search history.

(56) References Cited

U.S. PATENT DOCUMENTS

| | | | | |
|---|---|---|---|---|
| 7,940,795 B2* | 5/2011 | Frederiksen et al. | ......... | 370/468 |
| 8,031,670 B2* | 10/2011 | Johansson et al. | ............ | 370/330 |
| 8,189,502 B2* | 5/2012 | Kwak et al. | .................... | 370/311 |
| 2009/0154607 A1* | 6/2009 | Lindoff et al. | ................ | 375/341 |
| 2009/0168922 A1* | 7/2009 | Malladi et al. | ................ | 375/316 |
| 2009/0257449 A1* | 10/2009 | Chen et al. | .................... | 370/470 |
| 2009/0300456 A1* | 12/2009 | Pelletier et al. | ............... | 714/749 |
| 2010/0120424 A1* | 5/2010 | Johansson et al. | ......... | 455/435.1 |
| 2010/0195583 A1* | 8/2010 | Nory et al. | .................... | 370/329 |
| 2010/0254329 A1* | 10/2010 | Pan et al. | ...................... | 370/329 |
| 2010/0279628 A1* | 11/2010 | Love et al. | ...................... | 455/70 |
| 2011/0299490 A1* | 12/2011 | Nordstrom et al. | ........... | 370/329 |

* cited by examiner

*Primary Examiner* — Kwang B Yao
*Assistant Examiner* — Candal Elpenord
(74) *Attorney, Agent, or Firm* — Morgan, Lewis & Bockius LLP

(57) ABSTRACT

A method and apparatus of monitoring a control channel in a multiple carrier system is provided. A user equipment monitors a plurality of candidate control channels within a control region of a subframe and receives reference control information on a reference control channel which is successfully decoded. The user equipment monitors the control region on a basis of the reference control information and receives link control information on a linked control channel which is successfully decoded. The link control information includes resource assignment information used to receive or transmit data packets via a plurality of component carriers.

8 Claims, 16 Drawing Sheets

METHOD AND APPARATUS FOR MONITORING CONTROL CHANNEL IN MULTIPLE CARRIER SYSTEM

CROSS-REFERENCE TO RELATED APPLICATIONS

This application claims the benefit of priority of U.S. Provisional application 61/165,913 filed on Apr. 2, 2009, U.S. Provisional application 61/167,855 filed on Apr. 8, 2009, and Korean Patent Application No. 10-2010-0029425 filed on Mar. 31, 2010, all of which are incorporated by reference in their entirety herein.

BACKGROUND OF THE INVENTION

1. Field of the Invention

The present invention relates to wireless communications, and more particularly, to a method and apparatus for supporting multiple carrier in a wireless communication system.

2. Related Art

Wireless communication systems are widely spread all over the world to provide various types of communication services such as voice or data. In general, the wireless communication system is a multiple access system capable of supporting communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

Even if a bandwidth is set differently between an uplink and a downlink, only one carrier is generally considered in the conventional wireless communication system. The carrier is defined with a center frequency and a bandwidth. A multiple carrier system uses a plurality of carriers having a narrower bandwidth than a full bandwidth.

Long term evolution (LTE) based on 3rd generation partnership project (3GPP) technical specification (TS) release 8 is a promising next-generation mobile communication standard.

As disclosed in 3GPP TS 36.211 V8.5.0 (2008-12) "Evolved Universal Terrestrial Radio Access (E-UTRA); Physical Channels and Modulation (Release 8)", a physical channel of the LTE can be classified into a data channel, i.e., a physical downlink shared channel (PDSCH) and a physical uplink shared channel (PUSCH), and a control channel, i.e., a physical downlink control channel (PDCCH), a physical control format indicator channel (PCFICH), a physical hybrid-ARQ indicator channel (PHICH), and a physical uplink control channel (PUCCH).

A 3GPP LTE system supports only one bandwidth (i.e., one carrier) among {1.4, 3, 5, 10, 15, 20} MHz. The multiple carrier system uses two carriers having a bandwidth of 20 MHz to support a full bandwidth of 40 MHz, or uses three carriers respectively having bandwidths of 20 MHz, 15 MHz, and 5 MHz.

The multiple carrier system can support backward compatibility with a legacy system, and can significantly increase a data rate by using multiple carriers.

In a single carrier system, a control channel and a data channel are designed based on a single carrier. Therefore, it may be ineffective if a channel structure of the single carrier system is directly used in the multiple carrier system.

SUMMARY OF THE INVENTION

The present invention provides a method and apparatus for monitoring a control channel in a multiple carrier system.

The present invention also provides a method and apparatus for transmitting a control channel in a multiple carrier system.

In an aspect, a method of monitoring a control channel in a multiple carrier system is provided. A UE monitors a plurality of candidate control channels within a control region of a subframe and receives reference control information on a reference control channel which is successfully decoded. The UE monitors the control region on a basis of the reference control information and receives link control information on a linked control channel which is successfully decoded. The link control information includes resource assignment information used to receive or transmit data packets via a plurality of component carriers.

The reference control information may include information about at least one of a search space in which the linked control channel is monitored in the control region, a control channel element (CCE) aggregation level used for the linked control channel and a component carrier used for transmission of the linked control channel.

The reference control information may include information about a radio resource through which the linked control channel is received in the control region.

A UE's identifier may be masked to a Cyclic Redundancy Check (CRC) of the reference control information, and the UE's identifier is not masked to a CRC of the link control information.

The reference control information may include information about the plurality of component carriers which are joint coded in the linked control information.

The reference control channel may be monitored in a first search space in the control region, and the linked control channel may be monitored in a second search space in the control region.

The control region may comprise a plurality of control channel elements (CCEs), and an index of a CCE at which the second search space is started, from among the plurality of CCEs, may be spaced apart from an index of a CCE at which the first search space is started, from among the plurality of CCEs, by an offset.

In another aspect, a wireless apparatus for supporting multiple carrier is provided. The wireless apparatus includes a control channel monitoring unit configured to monitor a control channel. The control channel monitoring unit is configured to monitor a plurality of candidate control channels within a control region of a subframe and receive reference control information on a reference control channel which is successfully decoded, and monitor at the UE, the control region on a basis of the reference control information and receive link control information on a linked control channel which is successfully decoded. The link control information includes resource assignment information used to receive or transmit data packets via a plurality of component carriers.

In still another aspect, a method of monitoring a control channel in a multiple carrier system is provided. The method includes monitoring, at a user equipment (UE), a plurality of candidate control channels within a control region of a subframe and receiving reference control information on a reference control channel which is successfully decoded, and receiving, at the UE, link control information on a linked control channel on a basis of the reference control information, wherein the link control information includes resource assignment information used to receive or transmit data packets via a plurality of component carriers.

A burden due to blind decoding for monitoring a control channel can be reduced. Further, battery consumption of a user equipment can be reduced.

DESCRIPTION OF EXEMPLARY EMBODIMENTS

Figure 1:
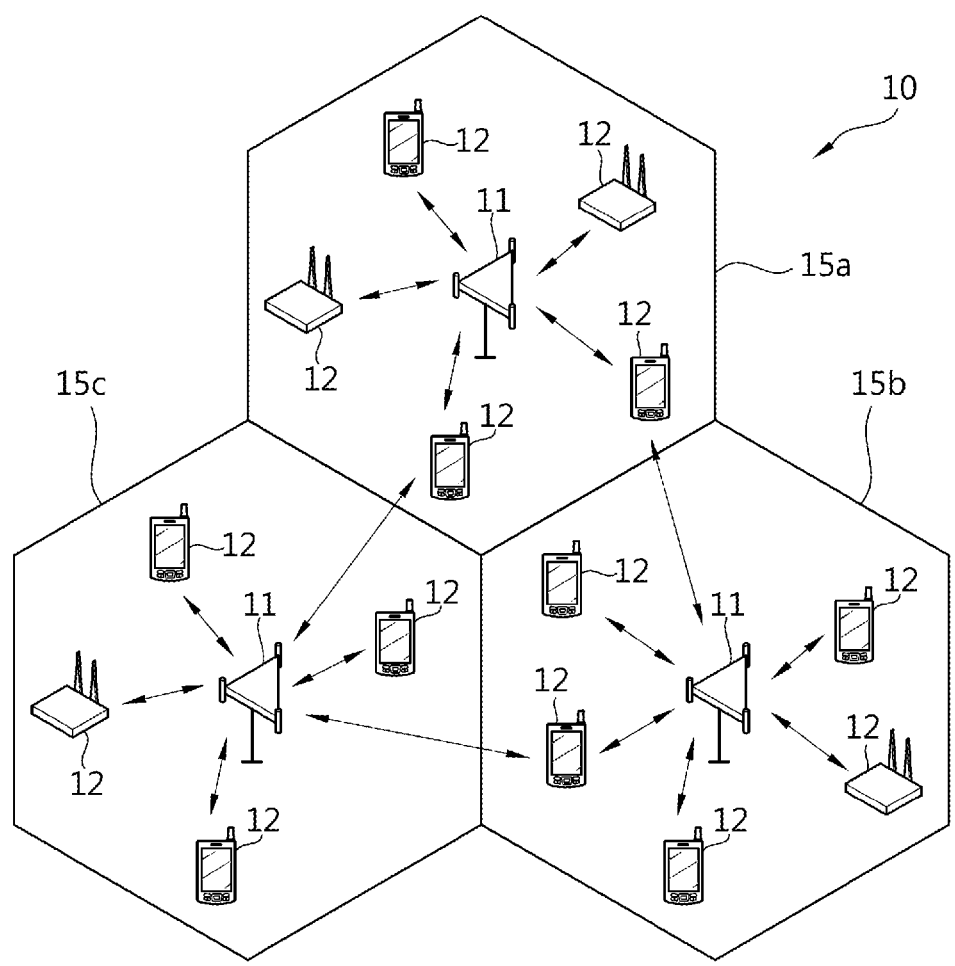
FIG. 1 is a diagram showing a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, downlink implies communication from the BS to the UE, and uplink implies communication from the UE to the BS. In the downlink, a transmitter may be a part of the BS, and a receiver may be a part of the UE. In the uplink, the transmitter may be a part of the UE, and the receiver may be a part of the BS.

Figure 2:
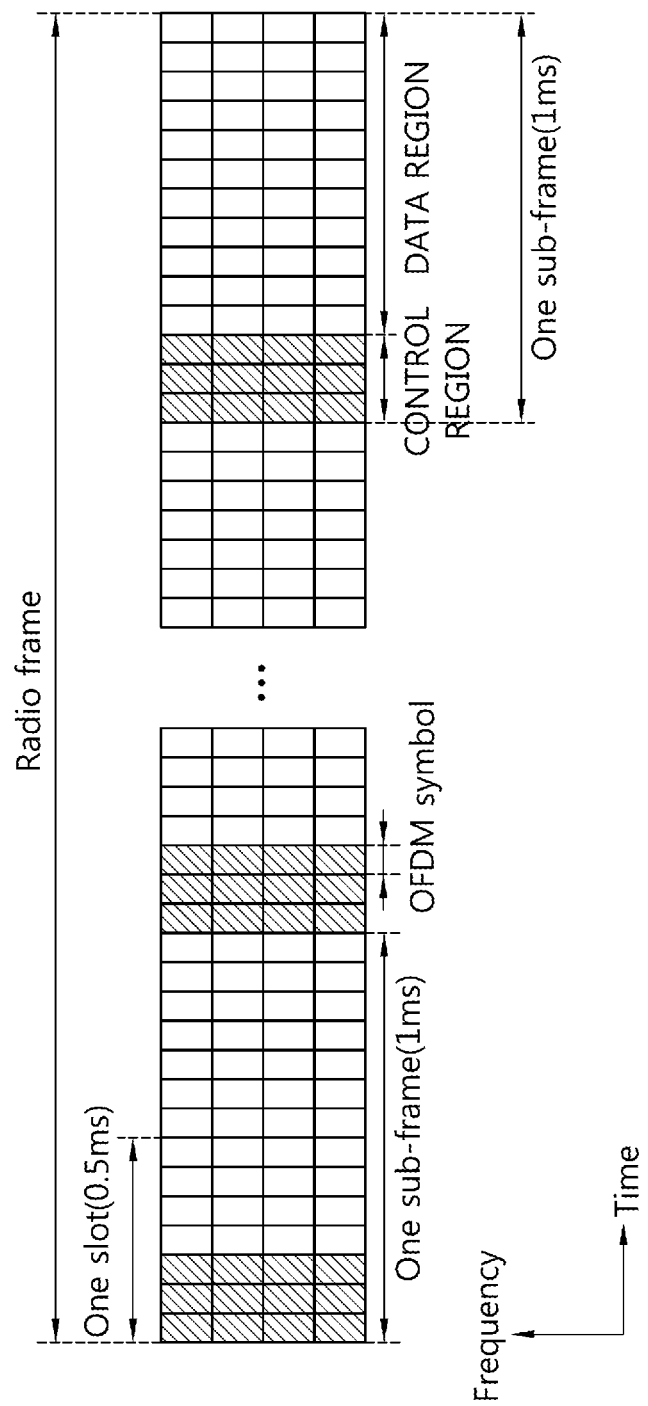
FIG. 2 is a diagram showing the structure of a radio frame in a 3GPP LTE.

FIG. 2 shows a radio frame structure in 3rd generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7*12 resource elements (REs).

A subframe is divided into a control region and a data region in time domain. The control region can include up to four preceding OFDM symbols of a 1st slot in the subframe. The number of OFDM symbols included in the control region may vary. A PDCCH is allocated to the control region, and a PDSCH is allocated to the data region.

Control information transmitted through the PDCCH is referred to as downlink control information (DCI). The DCI may include resource allocation of the PDSCH (this is referred to as a downlink grant), resource allocation of a PUSCH (this is referred to as an uplink grant), a set of transmit power control commands for individual UEs in any UE group and/or activation of a voice over Internet protocol (VoIP).

A PCFICH transmitted in a 1st OFDM symbol in the subframe carries a control format indicator (CFI) regarding the number of OFDM symbols (i.e., a size of the control region) used for transmission of control channels in the subframe. The UE first receives the CFI over the PCFICH, and thereafter monitors the PDCCH.

A PHICH can carry an positive-acknowledgement (ACK)/negative-acknowledgement (NACK) signal for uplink hybrid automatic repeat request (HARQ). The ACK/NACK signal for uplink data transmitted by the UE is transmitted on the PHICH.

Figure 3:
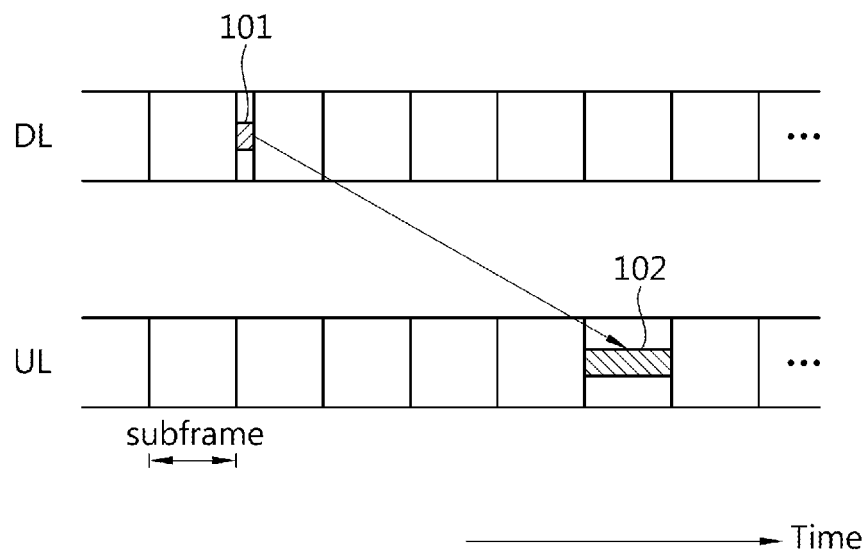
FIG. 3 is an exemplary diagram showing the transmission of uplink data.

FIG. 3 is an exemplary diagram showing the transmission of uplink data. A UE receives an uplink resource assignment on a PDCCH 101 by monitoring PDCCHs in a downlink subframe. The UE transmits a uplink data packet on a PUSCH 102 which can be constructed by using the uplink resource assignment.

Figure 4:
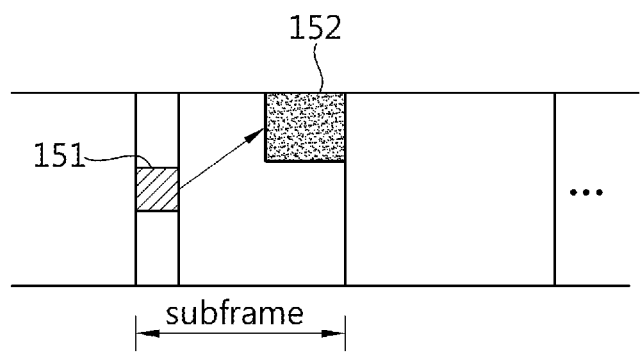
FIG. 4 is an exemplary diagram showing the reception of downlink data.

FIG. 4 is an exemplary diagram showing the reception of downlink data. A UE receives a downlink data packet on a PDSCH 152 indicated by a PDCCH 151. The UE receives a downlink resource assignment on the PDCCH 151 by monitoring PDCCHs in a downlink subframe. The UE receives the downlink data packet on the PDSCH 152 indicated by the downlink resource assignment.

Figure 5:
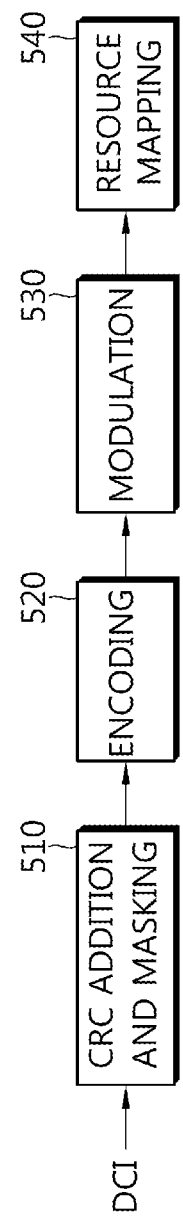
FIG. 5 is a block diagram showing the construction of a PDCCH.

FIG. 5 is a block diagram showing a structure of a PDCCH. A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH (block 510).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

When the C-RNTI is used, the PDCCH carries control information for a specific UE (this is referred to as UE-specific control information), and when other RNTIs are used, the PDCCH carries common control information received by all or a plurality of UEs in a cell.

The CRC-attached DCI is encoded to generate coded data (block 520). Encoding includes channel encoding and rate matching.

The coded data is modulated to generate modulation symbols (block 530).

The modulation symbols are mapped to physical resource elements (REs) (block 540). The modulation symbols are respectively mapped to the REs.

Figure 6:
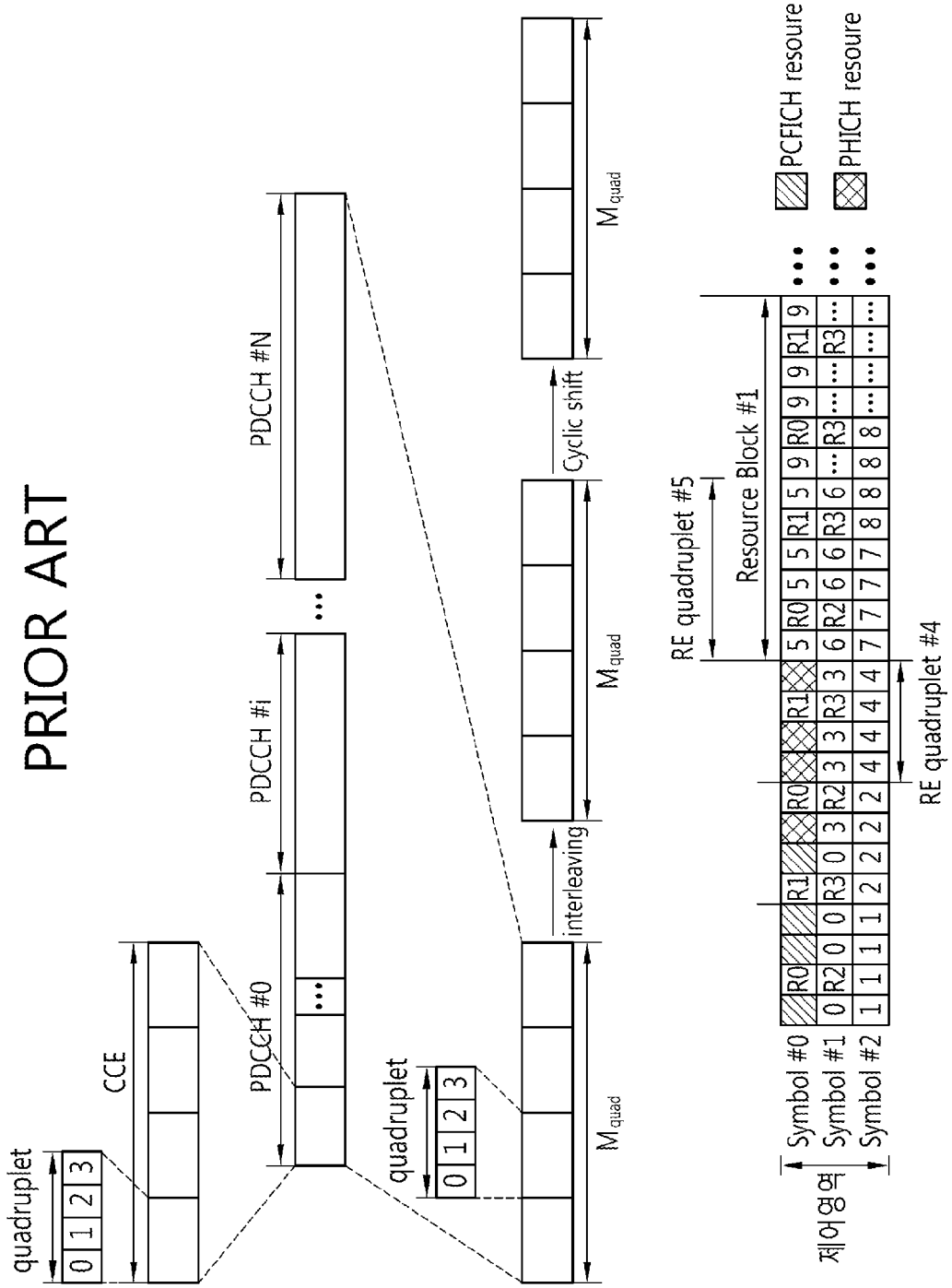
FIG. 6 is a diagram showing an example of resource mapping of a PDCCH.

FIG. 6 shows exemplary resource mapping of a PDCCH. This can refer to the section 6.8 of 3GPP TS 36.211 V8.5.0 (2008-12). R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a radio channel state, and corresponds to a plurality of resource element groups (REGs). According to an association relation of the number of CCEs and the coding rate provided by the CCEs, a PDCCH format and a possible number of bits of the PDCCH are determined.

One REG (indicated by a quadruple in FIG. 6) includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

A control channel consisting of one or more CCEs performs interleaving in an REG unit, and is mapped to a physical resource after performing cyclic shift based on a cell identifier (ID).

Figure 7:
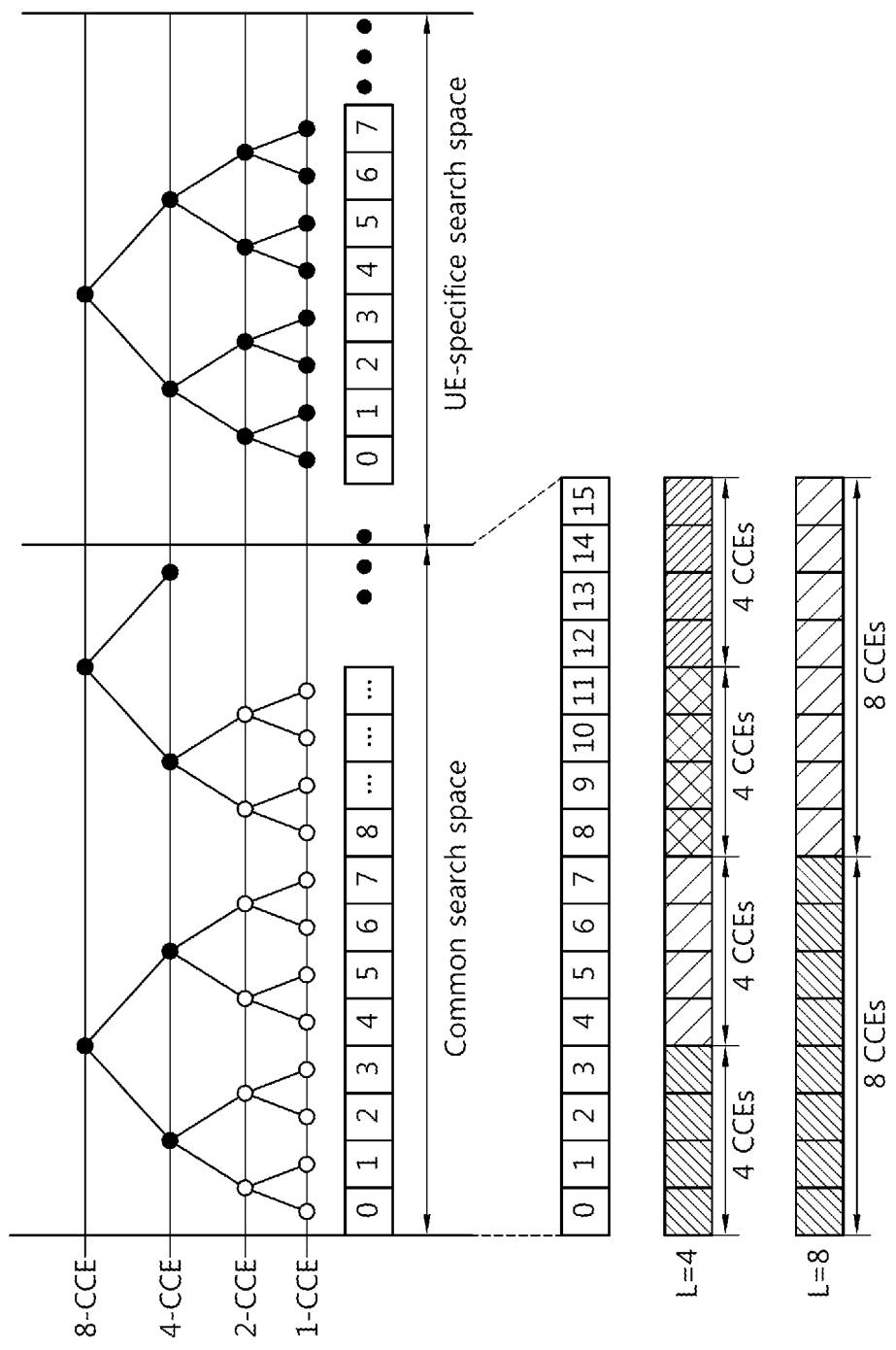
FIG. 7 is an exemplary diagram showing the monitoring of a PDCCH.

FIG. 7 shows exemplary monitoring of a PDCCH. This can refer to the section 9 of 3GPP TS 36.213 V8.5.0 (2008-12). The 3GPP LTE uses blind decoding for PDCCH detection. In the blind decoding, a specific identifier is de-masked from a CRC of a PDCCH (referred to as a candidate PDCCH), and then CRC error checking is performed to determine whether the PDCCH is a control channel of an entity performing the blind decoding.

A plurality of PDCCHs can be transmitted in one subframe. A UE monitors a plurality of PDCCHs in every subframe. Monitoring is an operation of attempting PDCCH decoding by the UE according to a format of the monitored PDCCH.

The 3GPP LTE uses a search space to reduce an overload caused by blind decoding. The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. In the common search space, a PDCCH for UE-specific control control information (e.g. DCI format 0, 1A) can be transmitted. The UE-specific search space supports a PDCCH having a CCE aggregation level of {1, 2, 4, 8}.

Table 1 shows the number of PDCCH candidates to be monitored by a UE.

TABLE 1

| Search Space Type | Aggregation level L | Size [in CCEs] | Number of PDCCH candidates | DCI formats |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

The size of the search space is defined in the Table 1, and the starting position of the search space is different between the UE-specific search space and common search space. The starting position of the common search space is fixed regardless of subframe, but the starting position of the UE-specific search space may be determined every subframe and may be obtained based on a UE's identifier (i.e. C-RNTI), a CCE aggregation level and/or the slot number in the subframe. The UE-specific search space may be overlapped with the common search space if the starting position of the UE-specific search space is in the common search space.

Now, a multiple carrier system will be described.

The 3GPP LTE system supports a case where a downlink bandwidth and an uplink bandwidth are set differently under the premise that one component carrier (CC) is used. This implies that the 3GPP LTE is supported only for a case where the downlink bandwidth and the uplink bandwidth are equal to or different from each other in a situation where one CC is defined for each of a downlink and an uplink. For example, the 3GPP LTE may support up to 20 MHz, and supports only one CC for the uplink and the downlink even if the uplink bandwidth and the downlink bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with a legacy system. For example, when 5 CCs are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in frequency domain and non-contiguous spectrum aggregation achieved between discontinuous carriers. The number of carriers aggregated in downlink may be different from the number of carriers aggregated in uplink. Symmetric aggregation is achieved when the number of downlink carriers is equal to the number of uplink carriers. Asymmetric aggregation is achieved when the number of downlink carriers is different from the number of uplink carriers.

CCs may have different sizes (i.e., bandwidths). For example, when 5 CCs are used to configure a band of 70 MHz, the band can be configured as 5 MHz carrier (CC #0)+20 MHz carrier (CC #1)+20 MHz carrier (CC #2)+20 MHz carrier (CC #3)+5 MHz carrier (CC #4).

Hereinafter, a multiple carrier system implies a system supporting multiple carriers on the basis of spectrum aggregation. The multiple carrier system can use contiguous spectrum aggregation and/or non-contiguous spectrum aggregation, and also can use either symmetric aggregation or asymmetric aggregation.

Cross-carrier scheduling is possible between multiple carriers. That is, a PDSCH of the CC #2 may be indicated using a downlink grant (or an uplink grant) of a PDCCH of the CC #1. A CC on which the PDCCH is transmitted may be referred to as a reference carrier or a primary carrier. A CC on which a PDSCH is transmitted may be referred to as a secondary carrier.

Figure 8:
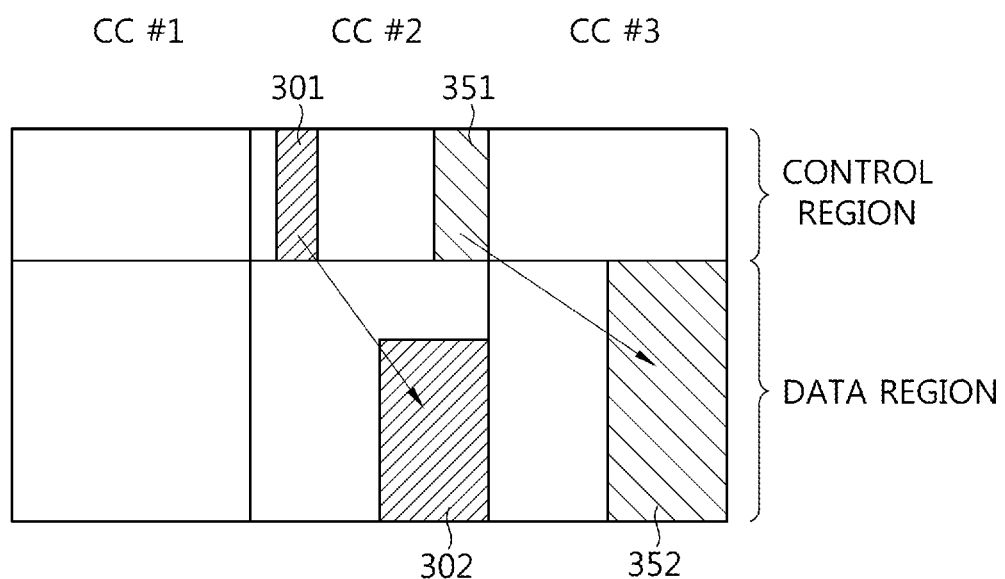
FIG. 8 is a diagram showing an example of separate coding.

FIG. 8 is a diagram showing an example of separate coding. The separate coding refers to that a PDCCH can carry control information regarding a resource assignment for a PDSCH/PUSCH corresponding to one carrier. That is, the PDCCH and the PDSCH/PUSCH correspond to each other in the one-to-one manner. For clarity, PDCCH-PDSCH relation for downlink transmission is disclosed herein for separate coding but the present invention can be applied to PDCCH-PUSCH relation for uplink transmission.

A first PDCCH 301 of a CC #2 carries a downlink assignment for a first PDSCH 302 of the CC #2. It means that the first PDCCH 301 and the first PDSCH 302 are transmitted through the same CC #2, which can provide backward compatibility with the existing LTE.

A second PDCCH 351 of the CC #2 carries a downlink assignment for a second PDSCH 352 of a CC #3. It means that the second PDCCH 351 and the second PDSCH 352 are transmitted through the different CCs. A DCI of the second PDCCH 351 can include an indicator (this may be referred to a carrier indicator field (CIF)) indicating the CC #3 on which the second PDSCH 352 is transmitted.

Figure 9:
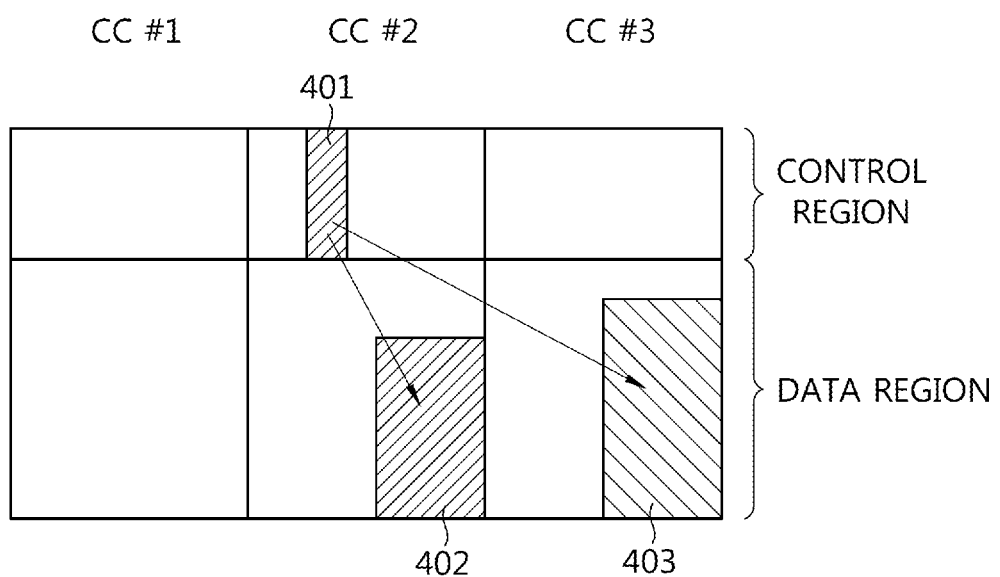
FIG. 9 is a diagram showing an example of joint coding.

FIG. 9 is a diagram showing an example of joint coding. The joint coding refers to that a single PDCCH can carry a downlink assignment for PDSCH/PUSCH corresponding to one or more CCs. The single PDCCH may be transmitted through one CC or over a plurality of CCs. For clarity, PDCCH-PDSCH relation for downlink transmission is disclosed herein for joint coding but the present invention can be applied to PDCCH-PUSCH relation for uplink transmission.

A PDCCH 401 of a CC #2 carries a downlink assignment for a PDSCH 402 of the CC #2 and a PDSCH 403 of a CC #3.

The structure of a control channel, proposed by the present invention on the basis of the above PDCCH structure, is described below.

Assuming that a UE supporting a single carrier and a UE supporting multiple carriers coexist within one cell, the structure of a control channel for the UE supporting multiple carriers is described below.

If the joint coding method is used, a variety of problems and restrictions, such as blocking probability, scheduling flexibility, and error propagation, can occur. There is proposed a scheme for mitigating the restrictions.

Figure 10:
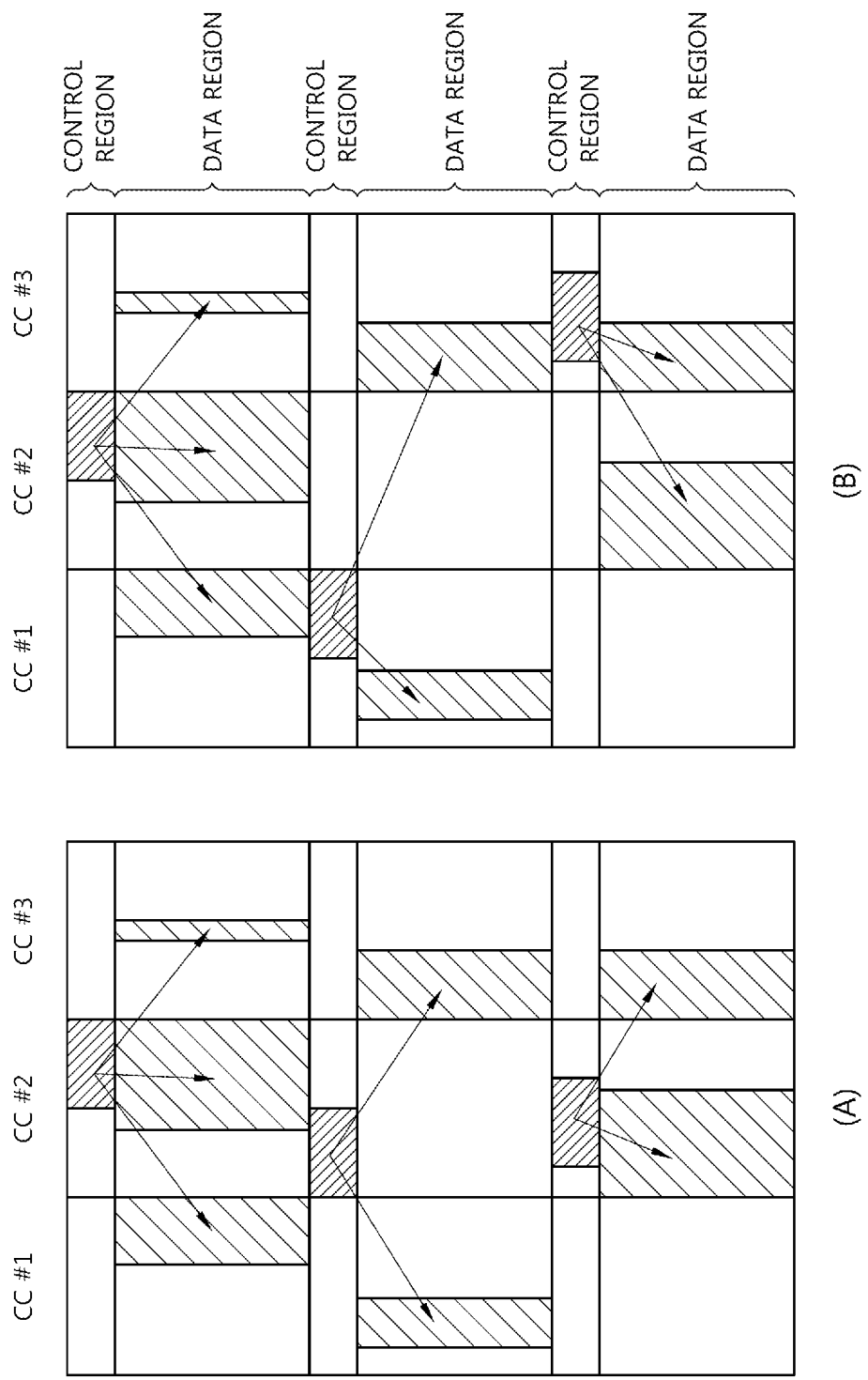
FIG. 10 is a diagram showing an example of the transmission of a joint-coded PDCCH.

FIG. 10 is a diagram showing an example of the transmission of a joint-coded PDCCH. The subfigure (A) of FIG. 10 shows an example in which a CC used for PDCCH transmission (i.e., a reference carrier) are semi-statically configured, and the subfigure (B) of FIG. 10 shows an example in which the reference carrier is dynamically changed in accordance with a carrier hopping method.

To semi-statically configure the reference carrier, a BS can inform a UE of configuration information, such as an index, a transmission cycle or both of the reference carrier, through system information or an RRC message.

The reference carrier can be changed for every subframe or periodically and dynamically. To dynamically configure the reference carrier, the configuration information, such as an index or a transmission cycle or both of the reference carrier, can be transmitted through PDCCHs.

If a UE knows a reference carrier which will monitor its PDCCH, the UE can monitor a joint-coded PDDCH in the same manner as the existing method. Further, a BS can configure a reference carrier for each UE and inform the corresponding UE of a CFI for the configured reference carrier.

In a multiple carrier system, however, a payload size (i.e., the size of a DCI) of a joint-coded PDCCH can be greater than a payload size of a PDCCH of a legacy system. This is because the joint-coded PDCCH includes resource assignment for a plurality of PDSCHs/PUSCHs. Accordingly, it may be necessary to configure a CCE aggregation level having a value greater than that of the existing CCE aggregation levels {1, 2, 4, 8}.

Additional CCE aggregation level can be arbitrarily configured as one of {10, 12, 20, ...}. To support CCE aggregation levels having a tree structure, such as that shown in FIG. 7, a set of additional CCE aggregation levels can have a $2_n$ structure, such as {16, 32, ...}. That is, the set of additional CCE aggregation levels is composed of a combination of the existing set of CCE aggregation levels {1, 2, 4, 8}. This is because if a search space for additional CCE aggregation level greater than 8 is assigned to consecutive CCE indices like the existing CCE aggregation level, any restriction can be put on the scheduling of PDCCHs.

Since the size of a DCI subject to joint coding can be in proportion to the number of CCs used, additional CCE aggregation level can be defined as in 8*Ncc (where Ncc is the number of element carriers).

If there are any additional CCE aggregation level, restriction can be put on the scheduling of a legacy UE which uses only the existing CCE aggregation levels {1, 2, 4, 8}. Accordingly, there is a need for a scheme for blind decoding for the additional CCE aggregation level, while guaranteeing compatibility with the existing CCE aggregation levels.

Figure 11:
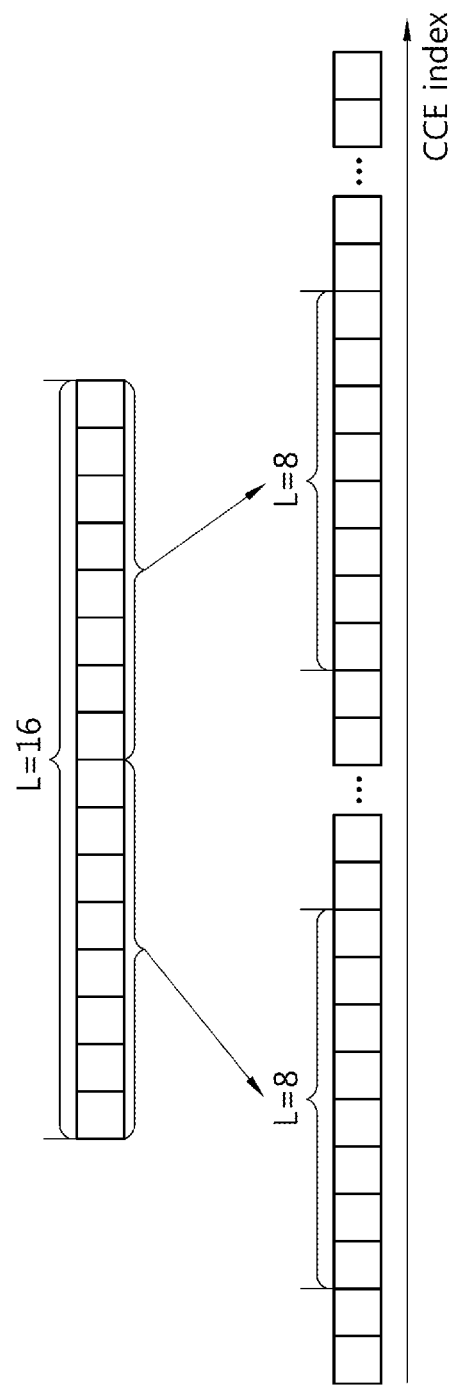
FIG. 11 is a diagram showing an example of the construction of added Control Channel Element (CCE) aggregation levels.

FIG. 11 is a diagram showing an example of the construction of added CCE aggregation levels.

In the case in which CCE aggregation level greater than the existing CCE aggregation level of {1, 2, 4, 8} is used, a search space for large CCE aggregation level cannot be assigned to contiguous CCEs, but can be assigned to a plurality of non-contiguous CCEs or contiguous CCEs composed of the existing CCE aggregation level of {1, 2, 4, 8}. That is, the search space for additional CCE aggregation level can be segmented in a unit of existing CCE aggregation level.

For example, a additional CCE aggregation level L=16 can be composed of two CCE aggregation levels each having a CCE aggregation level L=8. In this case, there are advantages in that a joint-coded PDCCH can be transmitted through a single CC and no further restrictions are put on the scheduling of PDCCHs using the existing CCE aggregation level.

A variety of methods are possible in order to perform the method of configuring one large CCE aggregation level using a plurality of small CCE aggregation levels, as described above, and a method of a UE performing blind decoding on the basis of the above method.

A PDCCH composed of a large CCE aggregation level greater than 8 is segmented in unit of a small CCE aggregation level (called a segmented CCE aggregation level) which is one of $\{1, 2, 4, 8\}$, and search space is assigned to the segmented CCE aggregation level. To configure a CCE aggregation level (L=16), two segmented CCE aggregation levels (each L=8) are used.

A first segmented CCE aggregation level can be assigned to a search space like the existing method, and a search space for a second segmented CCE aggregation level can be assigned to CCEs which has an offset from the CCEs of the search space for the first segmented CCE aggregation level. The offset can depend on the number of effective CCEs in a subframe and/or the number of available CCs. Alternatively, the offset may have a predetermined value.

In relation to the plurality of segmented CCE aggregation levels, different starting points can be defined. A starting point of the search space for the first segmented CCE aggregation level can be defined on the basis of the same value as the existing parameter (for example, A=39827 or D=65537), and a starting point of the search space for the second segmented CCE aggregation level can be defined on the basis of a value different from the existing parameter.

When the search space is configured, the number of candidate PDCCHs can be defined to be smaller than that of the legacy systems in order to reduce blind decoding complexity of a UE.

A UE supporting a single carrier performs blind decoding for the CCE aggregation level of $\{1, 2, 4, 8\}$, but a UE supporting multiple carriers performs blind decoding for a CCE aggregation level of 4, 8 or more.

If a set of CCE aggregation level have a structure such as $\{10, 12, 20 \ldots\}$ which do not meet the tree structure, the CCE aggregation level can be configured using a combination of the existing CCE aggregation level of $\{1, 2, 4, 8\}$. For example, to configure a CCE aggregation level L=10, both a CCE aggregation level L=8 and a CCE aggregation level L=2 can be used.

Figure 12:
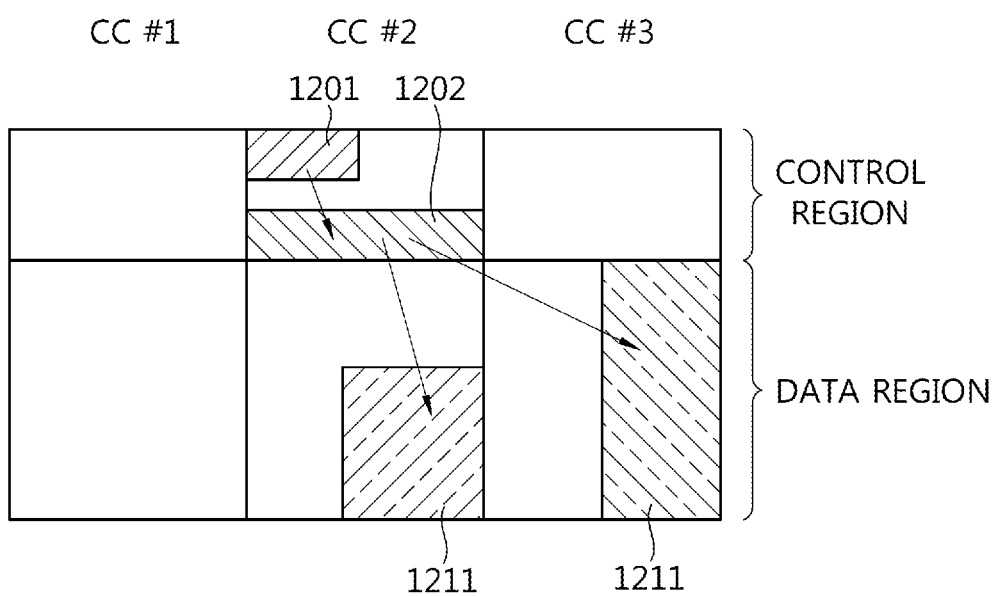
FIG. 12 is a diagram showing an exemplary structure of a proposed control channel.

FIG. 12 is a diagram showing an exemplary structure of a proposed control channel.

Two PDCCHs 1201 and 1202 are transmitted in the control region of a CC# 2. The two PDCCHs 1201 and 1202 include a reference PDCCH (also referred to as a first PDCCH or a primary PDCCH) 1201 and a linked PDCCH (also referred to as a second PDCCH or a secondary PDCCH) 1202. A reference DCI on the reference PDCCH 1201 includes information for receiving or monitoring a linked DCI on the linked PDCCH 1202. The linked DCI on the linked PDCCH 1202 includes a joint-coded DCI for scheduling at least one CC. For example, the linked DCI includes resource assignment information for receiving a first PDSCH 1211 of the CC #2 and a second PDSCH 1212 of a CC #3.

The reference PDCCH 1201 and the linked PDCCH 1202 can be transmitted in the control region of a single CC. The single CC is called a reference carrier. Since the CC to transmit the reference PDCCH is pre-determined, signaling overhead may be reduced.

Different identifiers can be masked to a CRC of the reference DCI on the reference PDCCH 1201 and a CRC of the linked DCI on the linked PDCCH 1202. It is assumed that an identifier masked to the CRC of the reference DCI is called a reference identifier and an identifier masked to the CRC of the linked DCI is called a linked identifier. The reference identifier can be a UE-specific identifier, a UE group identifier, or a common identifier. The linked identifier can be a UE-specific identifier (for example, a C-RNTI).

If the joint-coded PDCCH is used, the payload size of a DCI can be variable. The payload size of the DCI can be greatly changed depending on the number of scheduled CCs. Since DCI includes resource assignment for a plurality of data channels for a plurality of CCs, the payload size of the DCI may be increased in proportion to the number of scheduled CCs. To satisfy same code rate for the legacy PDCCH, the increased payload size of the DCI may result in larger CCE aggregation level than one of $\{1, 2, 4, 8\}$.

Assuming that the number of CCE aggregation levels necessary to schedule one CC is 4 and there are 4 CCs, a UE is obliged to attempt blind decoding for all the four CCE aggregation levels 4, 8, 16, and 32. It can be a burden on the definition of additional CCE aggregation level and can also cause a burden on the increased number of attempts for blind decoding.

Accordingly, by informing a UE of linkage information between PDCCHs on the reference PDCCH, a burden on the UE detecting the PDCCHs can be reduced.

A radio resource relationship between CCEs used to transmit the reference PDCCH and CCEs used to transmit the linked PDCCH can be previously designated. For example, radio resources (i.e., CCEs) used to transmit the linked PDCCH or a search space for searching for the linked PDCCH can be defined on the basis of the index of a first CCE from among the CCEs used to transmit the reference PDCCH. The linked PDCCH can be monitored by using a implicit relation with the reference PDCCH with any explicit signaling.

The reference DCI on the reference PDCCH can include information about the reception or monitoring of the linked PDCCH.

For example, the reference DCI can include information about the index of a CCE which is used by the linked PDCCH on the column of CCEs within the control region. The reference DCI can include information about a starting point for monitoring the linked PDCCH (i.e., the starting point of a search space) or a starting point for directly decoding the linked PDCCH without blind decoding.

A CCE index of the linked PDCCH indicated by the reference DCI can be given an offset value from the first CCE index or the last CCE index of the reference DCI.

The reference DCI can include information about a CCE aggregation level for monitoring the linked PDCCH.

The reference DCI can include information about a CC in which the linked PDCCH is transmitted. For example, the reference DCI can include a index of the CC in which the linked PDCCH is transmitted.

The reference DCI can include information about a CC scheduled through the linked PDCCH. For example, the reference DCI can include information about the number of CCs which are joint-coded in the linked DCI on the linked PDCCH.

Error in receiving the reference DCI gives an adverse influence on the scheduling of a UE. A BS can request the UE to send a reception acknowledgement which indicates whether the UE has received the reference DCI successfully. Or the UE can report the reception acknowledgement of the reference DCI to the UE without request. The reception acknowledgement may be a ACK/NACK signal.

In the case in which the reference DCI directly informs CCEs in which a linked PDCCH is transmitted, blind decoding needs not to be performed on the linked PDCCH. Accordingly, the UE-specific identifier can be masked to the CRC of the reference DCI, and an identifier cannot be masked to the CRC of the linked DCI. Accordingly, the UE can receive two PDCCHs by performing blind decoding for a single PDCCH, thereby being capable of reducing the consumption of battery power resulting from blind decoding.

The amount of resources used for the reference PDCCH can be fixed or pre-determined For example, the reference PDCCH can use only one or two of the CCE aggregation level among the set {1, 2, 4, 8}. For example, the reference PDCCH can use only the CCE aggregation level of 4 or the CCE aggregation level of 4 or 8. Relatively larger CCE aggregation level can be assigned for the reference PDCCH in order to guarantee reliable transmission.

The reference DCI can include information about the reception or monitoring of a plurality of linked PDCCHs. For example, assuming that one linked PDCCH includes scheduling information about a maximum of two CCs, two linked PDCCHs can be used for transmission of two part of scheduling information for four CCs.

In the case in which first and second linked PDCCHs are transmitted, the reference DCI can include information about the reception or monitoring of the first linked PDCCH only, and a first linked DCI on the first linked PDCCH can include information about the reception or monitoring of the second linked PDCCH. That is, assuming that there is a plurality of linked PDCCHs, the reference DCI includes information about the reception or monitoring of one linked PDCCH, and a linked DCI on each linked PDCCH includes information about the reception or monitoring of the other linked PDCCH.

The linked DCI can include scheduling information about at least one CC. The linked DCI can include a plurality of downlink resource assignments or a plurality of uplink resource assignments. The linked DCI can include at least one uplink resource assignment and at least one downlink resource assignment.

The payload size of the linked DCI on the linked PDCCH can be changed depending on the number of scheduled CCs. If the payload size of the linked DCI is increased, the size of a required CCE aggregation level can be increased more than 8. In this case, the above-described additional CCE aggregation level can be used.

The first PDCCH (i.e. the reference PDCCH) can be defined in the common search space, and the second PDCCH (i.e., the linked PDCCH) can be defined in the UE-specific search space. Alternatively, the first PDCCH can be defined in a first UE-specific search space, and the second PDCCH can be defined in a second UE-specific search space. The first UE-specific search space can use the existing UE-specific search space without change, and the second UE-specific search space can be further defined.

Figure 13:
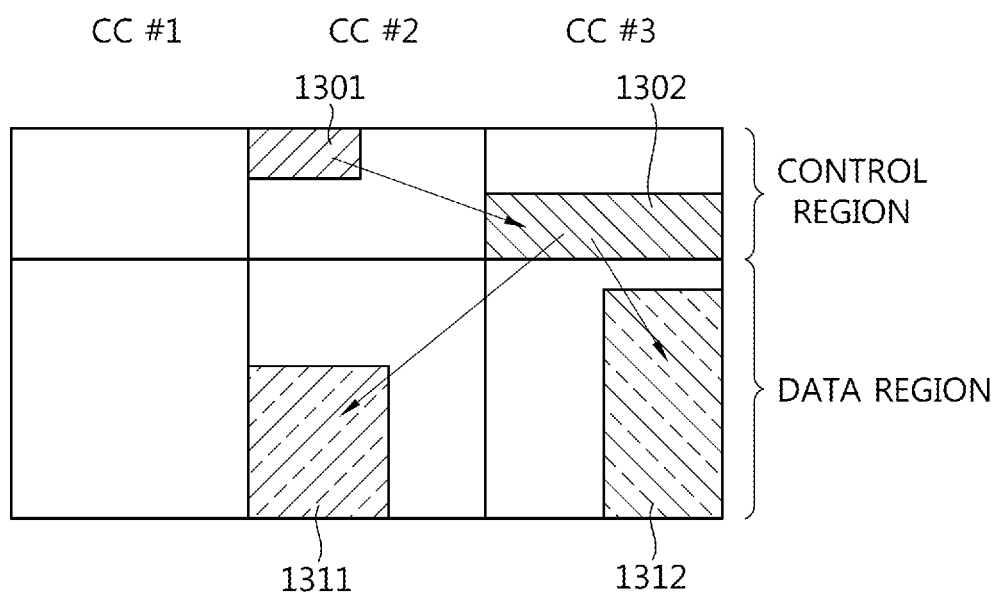
FIG. 13 is a diagram showing another exemplary structure of a proposed control channel.

FIG. 13 is a diagram showing another exemplary structure of a proposed control channel. Unlike the embodiment of FIG. 12, a reference PDCCH 1301 and a linked PDCCH 1302 are transmitted through different CCs. A reference DCI on the reference PDCCH 1301 can include information about an CC in which the linked PDCCH 1302 is transmitted.

Figure 14:
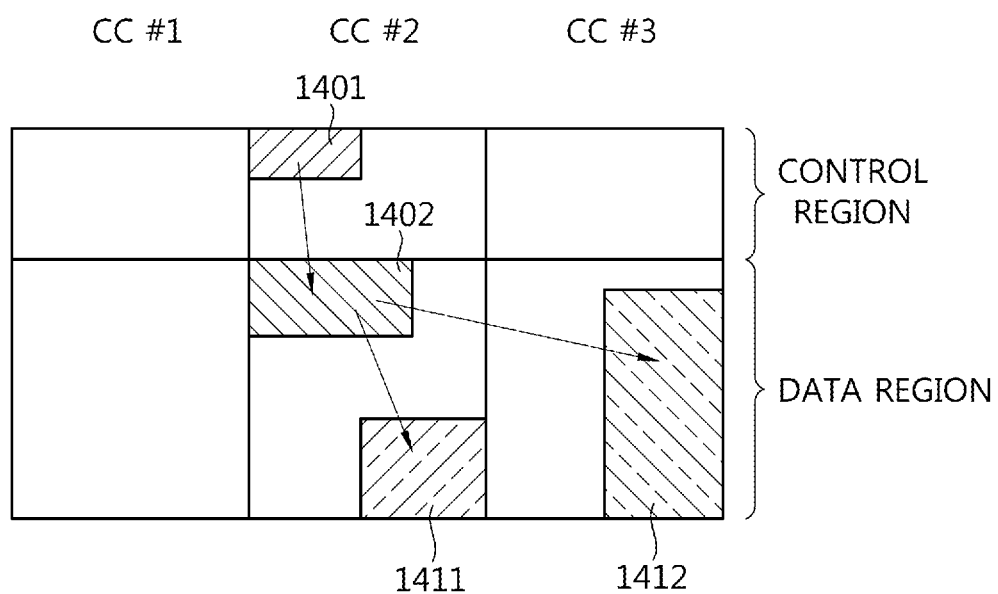
FIG. 14 is a diagram showing yet another exemplary structure of a proposed control channel.

FIG. 14 is a diagram showing yet another exemplary structure of a proposed control channel. Unlike the embodiment of FIG. 12, a linked PDCCH 1402 is transmitted in a data region of a subframe. A reference PDCCH 1401 is transmitted in a control region of the subframe and the linked PDCCH 1402 is transmitted in the data region of the subframe. If the size of the control region is only 1 or 2 OFDM symbols, the radio resource for the linked PDCCH 1402 may be insufficient. Joint coded DCI may occupy large amount of radio resources due to its large payload size. The transmission of the linked PDCCH in the data region may facilitate PDCCH scheduling.

A reference DCI on the reference PDCCH 1401 includes resource assignment information about the linked PDCCH 1402. The resource assignment information represents information about radio resource of the data region in which the linked PDCCH 1402 is transmitted.

The reference DCI may include information about the position of the radio resource of the data region in which the linked PDCCH 1402 is transmitted. For example, the reference DCI may include an index of physical resource block (PRB) in the data region.

A region (this is referred to as linked region) in which the linked PDCCH 1402 is transmitted may be pre-determined in the data region. The linked region is a part of the data region. The reference DCI may represent the linked region. The linked region may not overlap with other part of the data region in which other PDCCH is transmitted. The linked region and the other part may be frequency division multiplexing (FDM) or time division multiplexing (TDM). Logical CCEs may be defined in the linked region and the reference DCI may indicates the position of the linked PDCCH 1402 in the logical CCEs.

Although the reference PDCCH 1401 and the linked PDCCH 1402 are illustrated to be transmitted through the same CC, the reference PDCCH 1401 and the linked PDCCH 1402 can be transmitted through different CC. A reference DCI on the reference PDCCH 1401 can include information about an CC in which the linked PDCCH 1402 is transmitted.

Figure 15:
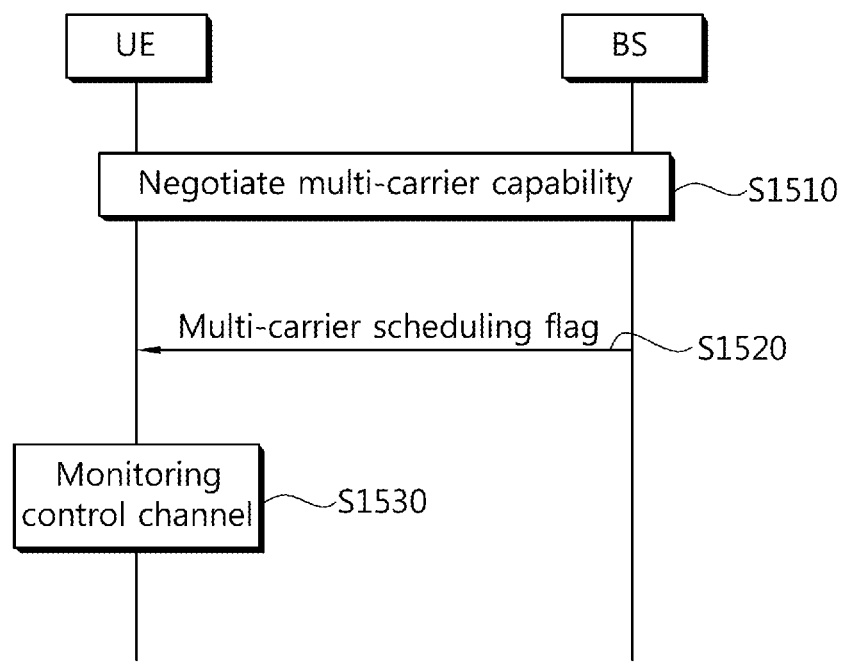
FIG. 15 is a flowchart illustrating a method according to an embodiment of the present invention.

FIG. 15 is a flowchart illustrating a method an embodiment of the present invention.

A UE and a BS negotiate a multi-carrier capability with each other at step S1510. The UE and the BS can negotiate whether multiple carriers are supported, the number of CCs supported, the number of available CCs, and the designation of a CC.

The BS sends a multi-carrier scheduling flag to the UE at step S1520. The multi-carrier scheduling flag informs the UE whether scheduling is performed on the basis of a single carrier or multiple carriers. If scheduling is performed on the basis of multiple carriers, a joint-coded PDCCH can be used.

The UE monitors a control channel on the basis of the multi-carrier scheduling flag at step S1530. When the multi-carrier scheduling is inactivated, the existing control channel monitoring method is used. When the multi-carrier scheduling is activated, the UE can acquire scheduling information about a plurality of CCs through a reference PDCCH and a linked PDCCH in accordance with the embodiments shown in FIGS. 12-14.

A UE does not always need the multi-carrier scheduling, although supporting a spectrum aggregation. Accordingly, when scheduling is performed on the basis of a single carrier, decoding complexity can be reduced by performing control channel monitoring based on the existing single carrier.

The multi-carrier scheduling flag has 1 bit and can inform whether the multi-carrier scheduling will be performed. Alternatively, the multi-carrier scheduling flag can have one or more bits and indicate information about the number of scheduled CC.

Figure 16:
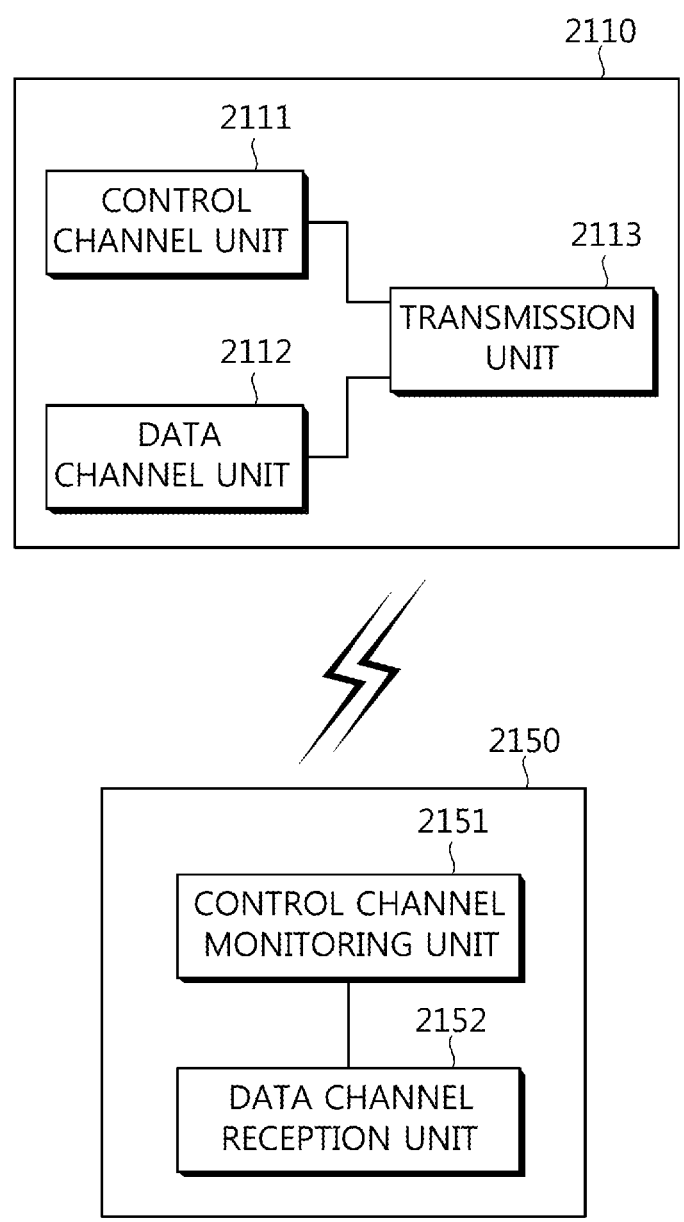
FIG. 16 is a block diagram showing a wireless communication system in which the embodiments of the present invention are implemented.

FIG. 16 is a block diagram showing a wireless communication system in which the embodiments of the present invention are implemented. A first wireless apparatus 2110 can be part of a BS, and a second wireless apparatus 2150 can be part of a UE.

The first wireless apparatus 2110 includes a control channel unit 2111, a data channel unit 2112, and a transmission unit 2113.

The control channel unit 2111 is a function medium for configuring a control channel to be monitored by a UE in accordance with the embodiments shown in FIGS. 12-15 and mapping the control channel to a control region or a data region in a subframe. The control channel may include a reference control channel and a linked control channel. The reference control channel carries reference control information for the second wireless apparatus 2150 to monitor the linked control channel. The linked control channel carries linked control information which includes resource assignment used to receive or transmit data packets via a plurality of CCs.

The data channel unit 2112 is a function medium for configuring a data channel. The data channel unit 2112 maps the data channel to the data region on the basis of the linked control information. The transmission unit 2113 is a function medium for sending the control channel and/or the data channel through at least one of a plurality of CCs.

The second wireless apparatus 2150 includes a control channel monitoring unit 2151 and a data channel reception unit 2152.

The control channel monitoring unit 2151 is a function medium for monitoring the reference control channel and/or the linked control channel in the control region in accordance with the embodiments shown in FIGS. 12-15. Or the control channel monitoring unit 2151 may receive the linked control channel in the data region. The control channel monitoring unit 2151 may receive the reference control information on the reference control channel by monitoring candidates control channels in the control region. The control channel monitoring unit 2151 may receive the linked control information on the linked control channel by monitoring the control region on the basis of the reference control information.

The data channel reception unit 2152 is a function medium for receiving downlink data packets on the data channel in the data region using resource assignment received on the control channel.

If the linked control information on the linked control channel contains uplink resource assignment for CCs, the data channel reception unit 2152 may transmit uplink data packets by using the uplink resource assignment.

The control channel unit 2111, the control channel monitoring unit 2151, the data channel unit 2112, and the data channel reception unit 2152 can be implemented in hardware or can be a protocol implemented by a processor (not shown). The protocol is stored in a memory (not shown) and executed by the processor.

The processor may include application-specific integrated circuit (ASIC), other chipset, logic circuit and/or data processing device. The memory may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory and executed by the processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of monitoring a control channel in a multiple carrier system, the method comprising:
    monitoring, at a user equipment (UE), at least one first candidate control channel within a control region of a subframe to receive first control information on a first control channel which is successfully decoded from the at least one first candidate control channel, and
    monitoring, at the UE, at least one second candidate control channel within a data region of the subframe on a basis of the first control information to receive second control information on a second control channel which is successfully decoded from the at least one second candidate control channel, the second control information including resource assignment information used to receive or transmit data packets via a plurality of component carriers.

2. The method of claim 1, wherein the first control information includes information about a search space in which the second control channel is monitored in the data region, a control channel element (CCE) aggregation level used for the second control channel and a component carrier used for transmission of the second control channel.

3. The method of claim 1, wherein the first control information includes information about a radio resource through which the second control channel is received in the data region.

4. The method of claim 3, wherein a UE's identifier is masked to a Cyclic Redundancy Check (CRC) of the first control information, and the UE's identifier is not masked to a CRC of the second control information.

5. The method of claim 1, wherein the first control channel is monitored in a first search space in the control region, and the second control channel is monitored in a second search space in the data region.

6. The method of claim 5, wherein the first control information includes information about the second search space.

7. A wireless apparatus for supporting multiple carriers, the wireless apparatus comprising a control channel monitoring circuitry configured to monitor a control channel, wherein the control channel monitoring circuitry is configured to: monitor at least one first candidate control channel within a control region of a subframe to receive first control information on a first control channel which is successfully decoded from the at least one first candidate control channel, and monitor at least one second candidate control channel within a data region of the subframe on a basis of the first control information to receive second control information on a second control channel which is successfully decoded from the at least one second candidate control channel, the second control information including resource assignment information used to receive or transmit data packets via a plurality of component carriers.

8. The wireless apparatus of claim 7, wherein the first control information includes information about a search space in which the second control channel is monitored in the data region, a control channel element (CCE) aggregation level used for the second control channel and a component carrier used for transmission of the second control channel.

* * * * *